United States Patent
Hyun

(10) Patent No.: US 11,877,569 B2
(45) Date of Patent: Jan. 23, 2024

(54) SPOOL FOR FISHING REEL

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 0 days.

(21) Appl. No.: 17/885,721

(22) Filed: Aug. 11, 2022

(65) Prior Publication Data
US 2023/0057642 A1    Feb. 23, 2023

(30) Foreign Application Priority Data

Aug. 19, 2021 (KR) .......................... 10-2021-0109399

(51) Int. Cl.
*A01K 89/01*    (2006.01)
*A01K 89/015*    (2006.01)

(52) U.S. Cl.
CPC .............................. *A01K 89/01931* (2015.05)

(58) Field of Classification Search
CPC .......... A01K 89/0111; A01K 89/01931; B65H 75/10; B65H 75/14; B65H 75/18
See application file for complete search history.

(56) References Cited

U.S. PATENT DOCUMENTS

| | | | | |
|---|---|---|---|---|
| 842,551 A * | 1/1907 | Hunter | ................. | A01K 89/016 242/312 |
| 1,761,750 A * | 6/1930 | Schafer | ................. | A01K 89/015 242/321 |
| 2,573,240 A * | 10/1951 | Berlinger | ......... | A01K 89/01931 242/321 |
| 2,858,999 A * | 11/1958 | Guenther, Jr. | ..... | B65H 75/2281 242/125.1 |
| 4,369,933 A * | 1/1983 | Bedenbaugh | .......... | B65H 75/28 242/125.1 |
| 5,507,443 A * | 4/1996 | Miyazaki | ............. | A01K 89/015 242/322 |
| 6,609,671 B2 * | 8/2003 | Heesch | .............. | A01K 89/0111 242/586 |

(Continued)

FOREIGN PATENT DOCUMENTS

| CN | 103328358 A | * | 9/2013 | ............ B65H 54/20 |
|---|---|---|---|---|
| KR | 200305931 | | 3/2003 | |

(Continued)

*Primary Examiner* — Emmanuel M Marcelo
(74) *Attorney, Agent, or Firm* — CANTOR COLBURN LLP

(57) ABSTRACT

Provided is a fishing reel spool that has a line knot hider. The spool for a fishing reel includes a knot hider for hiding a knot of a fishing line inside the surface of a winding part such that a line is uniformly wound on the winding section without a knot exposed outside the surface of the winding section, thereby not interfering with thumbing in casting and enabling even a beginner to easily connect and use a fishing line without connecting a fishing line to a spool using a complicated knotting manner. The spool for a fishing ring includes a drum-shaped winding part mounted on a reel body by a shaft and configured to wind a fishing line on an outer surface thereof, and a knot hider configured to hide a knot of the fishing line inside a surface of the winding part.

2 Claims, 18 Drawing Sheets

(56) References Cited

U.S. PATENT DOCUMENTS

| | | | | |
|---|---|---|---|---|
| 7,490,790 | B1* | 2/2009 | Gruber | A01K 89/01931 |
| | | | | 242/584.1 |
| 10,492,483 | B1* | 12/2019 | Niitsuma | A01K 89/01931 |
| 10,716,363 | B1* | 7/2020 | Masat | A43C 7/005 |
| 2002/0195511 | A1* | 12/2002 | Heesch | A01K 89/0111 |
| | | | | 242/322 |
| 2011/0079672 | A1* | 4/2011 | Kim | A01K 89/01557 |
| | | | | 242/289 |
| 2014/0054403 | A1* | 2/2014 | Maerz | A01K 89/01931 |
| | | | | 242/231 |
| 2018/0132465 | A1* | 5/2018 | Hyun | A01K 89/01931 |
| 2019/0150417 | A1* | 5/2019 | Semons | A01K 89/01931 |
| 2019/0373876 | A1* | 12/2019 | Bin Ahmad | A01K 89/0186 |
| 2020/0344989 | A1* | 11/2020 | Grant | A01K 89/01931 |
| 2021/0289762 | A1* | 9/2021 | Cardenas | A01K 97/12 |

FOREIGN PATENT DOCUMENTS

| | | | | |
|---|---|---|---|---|
| KR | 20180036518 | | 4/2018 | |
| KR | 20190026549 | A * | 3/2019 | A01K 89/01 |
| KR | 20190074942 | | 6/2019 | |

* cited by examiner

SPOOL FOR FISHING REEL

BACKGROUND OF THE INVENTION

Field of the Invention

The present disclosure relates to a fishing reel spool that has a line knot hider. In detail, the present disclosure relates to a spool for a fishing reel that includes a knot hider for hiding a knot of a fishing line inside the surface of a winding part such that a line is uniformly wound on the winding section without a knot exposed outside the surface of the winding section, thereby not interfering with thumbing in casting and enabling even a beginner to easily connect and use a fishing line without connecting a fishing line to a spool using a complicated knotting manner.

Description of the Related Art

As can be seen from Korean Patent Application Publication No. 10-2018-0036518, Korean Utility Model No. 20-0305931, Korean Patent Application Publication No. 10-2019-0074942, etc., fishing reels, such as a bait casting reel and a spinning reel, are necessarily equipped with a spool on which a fishing line is wound.

Such spools of fishing reels are drum types and a fishing line is tied on the winding section of spools through complicated knots so that the fishing line can be safely wound without idling.

However, since the manner of spool knots of fishing lines is very complicated and various and requires high skill, there is a problem that beginners must make considerable efforts and pay attention even when they wind a fishing line on a spool.

Further, when a fishing line is tied and fixed on the winding part of a spool, a knot is positioned on the surface of the winding part of the spool, so the fishing lines wound on the knot portion protrude further than other portions, and accordingly, there is a defect that it is inconvenient to use the fishing reel because the protruding portion interferes with thumbing that controls a rotation speed by pressing the spool with a finger in casting.

Accordingly, for reduction of the weight of a spool and connection of a fishing line, a product having several holes on the surface of the winding part of a spool so that a user can wind a fishing line by inserting fishing line between the holes of the spool and then knotting the fishing line has been released.

However, this type of knotting a fishing line using holes of a spool still has the problem because a knot protrudes from the surface of the winding part of the spool, and this knot is also different from common manners, so there is a defect that beginners have difficulty in learning. Further, since the machined surfaces of the holes of the spools are sharp, a fishing line is cut or a knot is untied when the spool is rotated to wind the fishing line while maintaining tension in the early stage in many cases.

SUMMARY OF THE INVENTION

Accordingly, the present disclosure has been made in an effort to solve the problems described above and an objective of the present disclosure is to provide a spool for a fishing reel that enables a fishing line to be uniformly wound with a uniform height on a winding part by hiding a knot inside the surface of the winding part so that thumbing is not interfered with by the knot of the fishing line in casting, and that enables a user to easily connect and fix the end of a fishing line to the spool using a simple knot without connecting the fishing line in a complicated knot manner when it is required to replace a fishing line, for example, a fishing line is tangled or cut during fishing.

In order to achieve the objectives, a spool for a fishing ring according to the present disclosure includes a drum-shaped winding part mounted on a reel body by a shaft and configured to wind a fishing line on an outer surface thereof, and a knot hider configured to hide a knot of the fishing line inside a surface of the winding part.

In the spool for a fishing ring according to the present disclosure, the knot hider may include: a fitting groove formed around the surface of the winding part such that a ring of a knotted fishing line is fitted therein; and a hiding section connected to the fitting groove to accommodate a knot of the fishing line.

The spool for a fishing ring according to the present disclosure may further include a spoke wall dividing an internal space of the winding part into left and right sections, in which the fitting groove is disposed on the same line as the spoke wall, and the hiding section is formed at left and right sides of the spoke wall.

In the spool for a fishing ring according to the present disclosure, the knot hider may include: an insertion hole formed through the winding part such that a knot of a fishing line is inserted inside the winding part; and a locking groove formed through the winding part with an end connected to the insertion hole such that a knot of the fishing line inserted in the insertion hole is locked inside the winding part.

The spool for a fishing ring according to the present disclosure has the following effects.

Since a knot of a fishing line is hidden inside the surface of the spool, it is possible to uniformly wind a fishing line with uniform heights, so a user can conveniently wind a fishing line without being interfered with when thumbing in casing.

Since it is possible to easily connect and fix a fishing line using general simple knots rather than a complicated knot, even beginners can easily replace and connect fishing lines.

Since a knot of a fishing line is not moved out of the initial hidden position, it is possible to conveniently fix a fishing line regardless of the winding direction of the fishing line and the knot of the fishing line is not easily pulled out.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Figure 1:
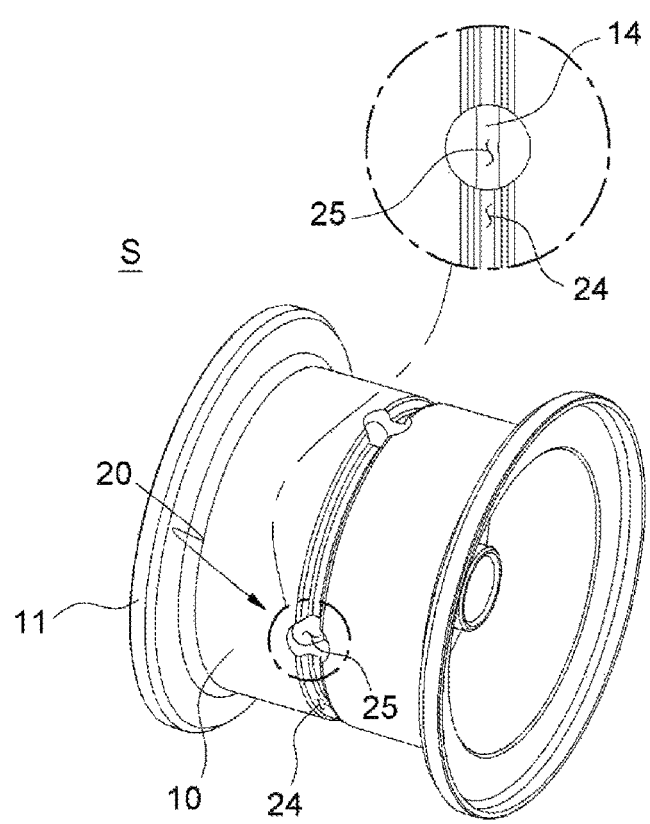
FIG. 1 is a perspective view showing a first embodiment of the present disclosure.
Figure 2:
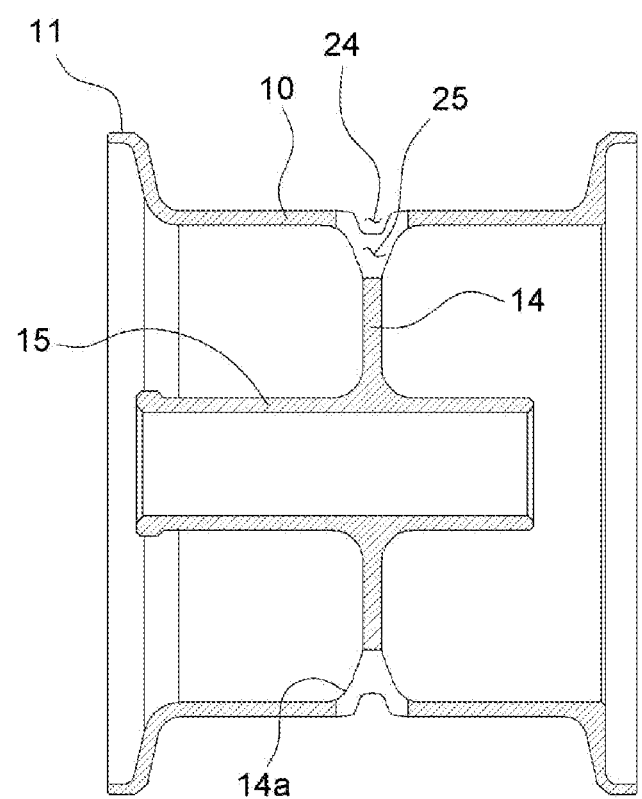
FIG. 2 is a cross-sectional view of FIG. 1.

The present disclosure may be modified in various ways and implemented by various exemplary embodiments, so that aspects (or embodiments) will be described in detail. However, it is to be understood that the present disclosure is not limited to the specific exemplary embodiments, but includes all modifications, equivalents, and substitutions included in the spirit and the scope of the present disclosure.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood on the basis of this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present disclosure should not be interpreted narrowly.

The terminology used herein is for the purpose of describing particular aspects (or embodiments) only and is not intended to be limiting of the present disclosure. Singular forms are intended to include plural forms unless the context clearly indicates otherwise.

It will be further understood that the terms "comprises" or "composed of" used in this specification, specify the presence of stated features, steps, operations, components, parts, or a combination thereof, but do not preclude the presence or addition of one or more other features, numerals, steps, operations, components, parts, or a combination thereof.

Unless defined otherwise, it is to be understood that all the terms used in the specification including technical and scientific terms has the same meaning as those that are understood by those who skilled in the art. It will be further understood that terms such as terms defined in common dictionaries should be interpreted as having a meaning that is consistent with their meaning in the context of this specification and the relevant art and will not be interpreted in an idealized or overly formal sense unless expressly so defined herein.

Terms such as "a first ~" and "a second ~" are used only for the purpose for distinguishing a constitutive element from other constitutive element, but constitutive element should not be limited to a manufacturing order, and the terms described in the detailed description of the present disclosure may not be consistent with those described in the claims.

For convenience of the description of a spool for a fishing reel according to the present disclosure, when an approximate direction rather than a precise direction is specified with reference to FIG. 1, a lower side is determined based on a direction to which gravity is applied, and up and down directions and right and left directions are determined based on the lower side. This standard may be also applied to the other drawings, and directions may be specified and described based on this standard unless the detailed description of the invention and the claims specially indicate otherwise.

Hereafter, a spool for a fishing reel according to the present disclosure is described with reference to the accompanying drawings.

The present disclosure relates to a spool for a fishing reel. The spool, as shown in FIGS. 1 to 15, includes: a drum-shaped winding part coupled to a reel body by a shaft and winding a fishing line on the outer surface thereof; and a knot hider 20 hiding a knot of a fishing line inside the surface of the winding part 10.

FIGS. 1 to 10 show embodiments in which the knot hider 20 is provided at the winding part 10 of the spool S and FIGS. 11 to 15 show examples in which the knot hider 20 is provided at the winding part 10 of the spool S and a separate line clip 20C.

First, as a common structure of first to third embodiments of the present disclosure, the spool S of the present disclosure has a drum structure like a reel and the internal space of the winding part 10 is empty.

In detail, the spool S of the present disclosure is open at both sides of the winding part 10 and a flange 11 having a larger outer diameter than the winding part 10 is connected to one side or both sides of the winding part 10.

The winding part 10 includes a spoke wall 14 that divides the internal space of the winding part 10 into left and right sections and isolates the left and right sections.

A shaft portion 13 through which the shaft of the spool S is disposed is protruded and connected laterally through the spoke wall 14, that is, in the longitudinal direction of the shaft in a pipe shape.

Figure 14:
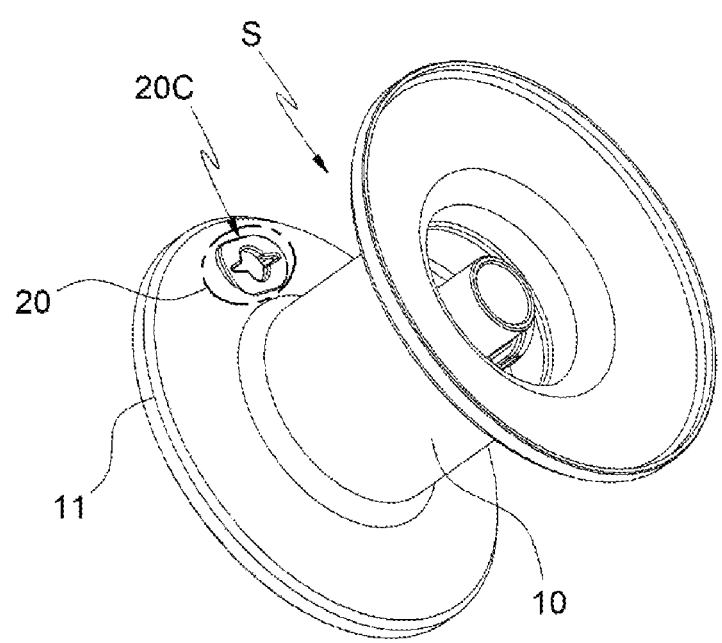
FIGS. 14 and 15 are perspective views showing modified examples of FIG. 11.
Figure 15:
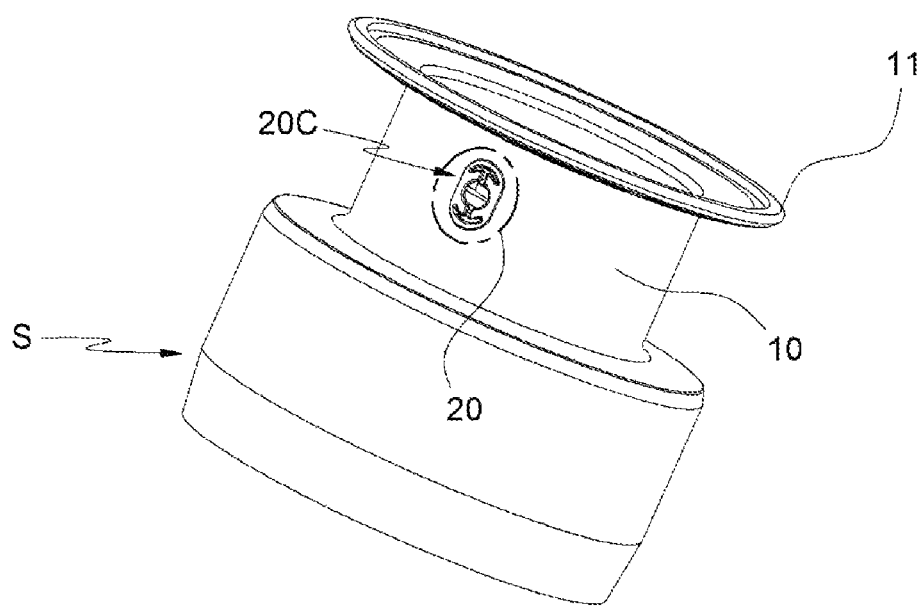

There is a difference in that the spool S shown in FIGS. 1 to 14 is supposed to be used for a bait casting reel and has flanges 11 on both sides of the winding part 10 and the spool S shown in FIG. 15 is supposed to be used for a spinning reel and has a flange 11 on one side of the winding part 10.

The knot hider 20 may be disposed at a position where a fishing line is wound on the winding part 10, as shown in FIGS. 1 to 7, and 11 and 12, or the knot hider 20 including a line clip 20C may be disposed at the flange 11 of the winding part 11, as shown in FIG. 14.

As a first embodiment of the knot hider 20, as shown in FIGS. 1 to 3C, the knot hider 20 has a fitting groove 24 that is formed around the surface of the winding part 10 and in which a ring of a knotted fishing line is fitted, and a hiding section that is connected to the fitting groove 24 and in which a knot of a fishing line is accommodated.

The fitting groove 24 is formed to have a width and a length that correspond to the thickness of a fishing line.

The hiding section has only to prevent a knot of a fishing line from protruding from the surface of the winding part and is not limited in shape, structure, etc.

For example, a fitting hole 25 that is formed through the winding part 10 and in which a knot of a fishing line is fitted can be seen as the hiding section from the drawings of the specification.

Though not shown in the figures, a dimple-shaped accommodation groove that is wider and deeper than the fitting groove 24 may be formed on the surface of the winding part 10 and may function as the hiding section.

Several hiding sections are arranged with predetermined intervals along the fitting groove 24 and the fitting hole 25 is described as a representative of the hiding sections.

In order to maintain balance of the weight of the spool S, the fitting groove 24 is formed at the center of the winding part 10 and the fitting holes 25 are circumferentially arranged along the fitting groove 24.

The spool S of the present disclosure has the spoke wall 14 dividing the internal space of the winding part 10 into left and right sections, the fitting groove 24 is disposed on the same line as the spoke wall 14, and the fitting holes 25 are formed at left and right sides of the spoke wall 14.

Similarly, the spoke wall 14 is formed at the center in the internal space of the winding part 10 to maintain balance of the weight of the spool S.

The fitting hole 25, which is a circular or oblong hole having a diameter larger than the thickness of the spoke wall 14, is divided in semicircular holes at both sides of the spoke wall 14.

The fitting hole 25 is bored to a portion of the edge of the spoke wall 14, whereby the spaces at the left and right sides of the spoke wall 14 are connected to each other.

The spoke wall 14 has a reinforcement rib 14a, which increases in thickness toward the outer end, on the edge connected to the inner surface of the winding part 10.

The reinforcement rib 14a reinforces the winding part 10 of which the thickness decreases due to forming of the fitting groove 24, thereby increasing durability of the spool S.

Figure 3A:
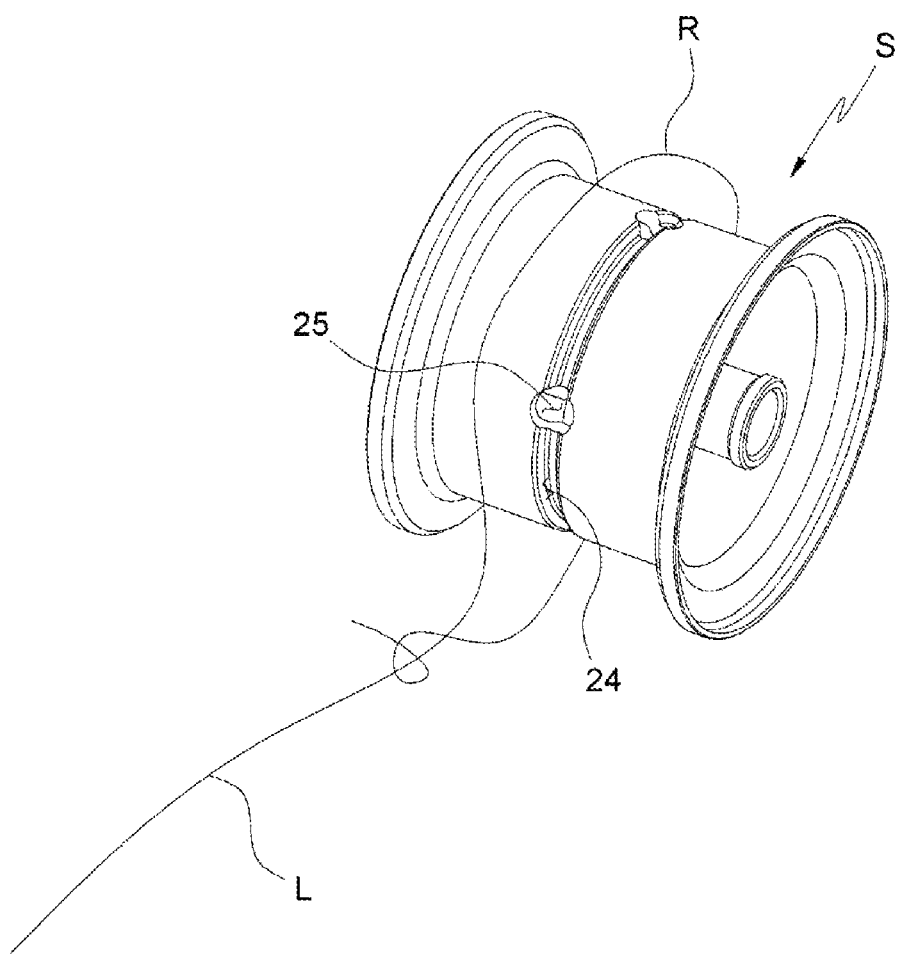
FIGS. 3A, 3B, and 3C are perspective views showing a method of fixing a fishing line using the first embodiment of the present disclosure.

In such a first embodiment of the present disclosure, first, as shown in FIG. 3A, when a fishing line L is wound and knotted on the winding part 10, a ring R is formed at an end of the fishing line L.

Figure 3B:
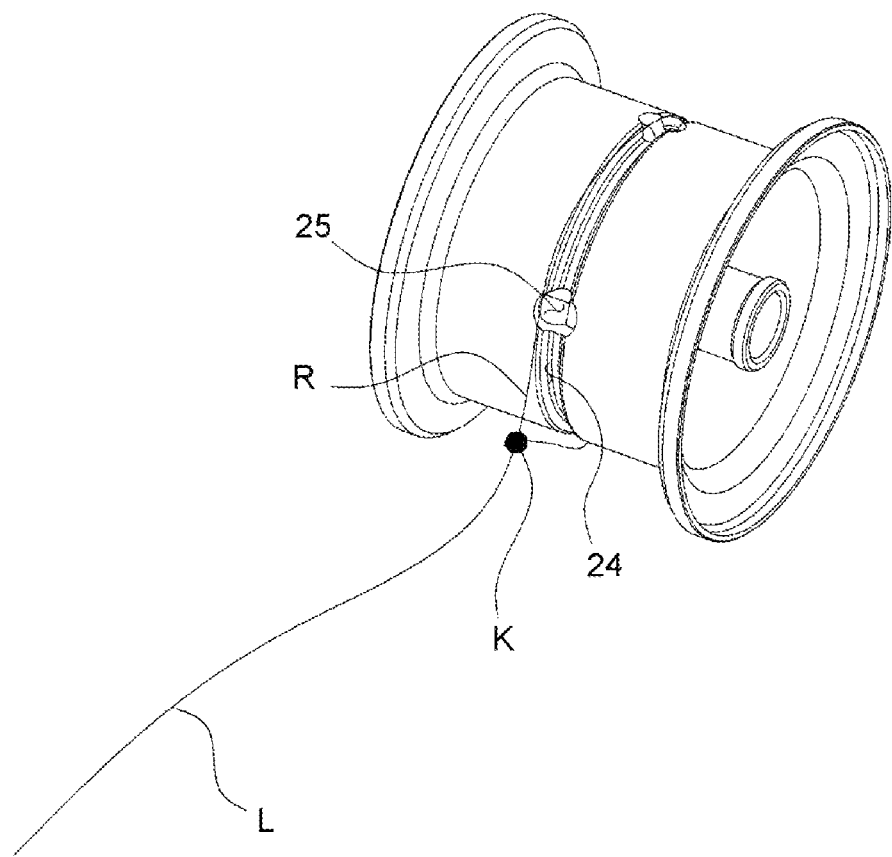

As shown in FIG. 3B, when a user guides the ring R of the fishing line L into the fitting groove 24 at the center of the winding part 10, and holds the knot K and pulls the fishing line L, the ring R is closed and fitted into the fitting groove 24.

Figure 3C:
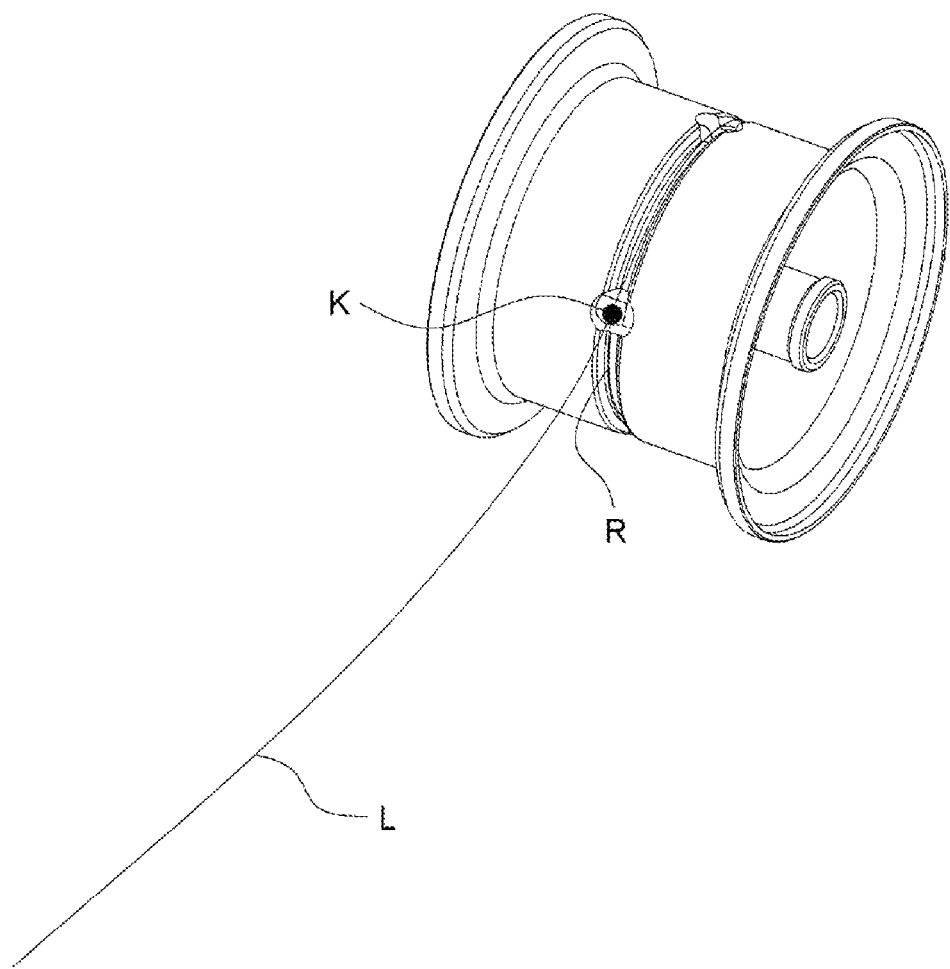

Next, as shown in FIG. 3C, the user guides the knot K to the position of one of the fitting holes 25 by turning the spool S or the ring R and then finally tightens the fishing line L, whereby the knot K of the fishing line L goes into the fitting hole 25.

Accordingly, the ring R and the knot K for fastening the fishing line L to the spool S are hidden in the fitting groove 24 and the fitting hole 25 that constitute the knot hider 20, so the fishing line L and the knot K do not protrude from the surface of the winding part 10. Therefore, when the fishing line L is wound, it is wound with a uniform height. Further, since a protrusion portion of the fishing line L due to the knot K is not formed, thumbing is not interfered with in casting.

As another embodiment of the present disclosure, as shown in FIGS. 4 to 15, the knot hider 20 includes: an insertion hole 21 formed through the winding part 10 so that a knot of a fishing line is inserted inside the winding part 10; and a locking groove 22 formed through the winding part 10 with an end connected to the insertion hole 21 so that a knot of a fishing line inserted in the insertion hole is locked inside the winding part 10.

In detail, the insertion hole 21 is formed through the outer surface of the winding part 10 and connected to the internal space, and the front-rear and left-right widths thereof are larger than a short width 22w of the locking groove 22.

The locking groove 22 is formed through the outer surface of the winding part 10 and connected to the internal space with an end connected to the insertion hole 21, thereby having a predetermined length.

Accordingly, a knot of a fishing line inserted in the internal space through the insertion hole 21 can be fitted in the locking groove 22 and locked and fixed to the inner surface of the locking groove 22.

FIGS. 4 to 10 show a second embodiment in which the knot hider 20 is provided at the winding part 10 of the spool S and FIGS. 11 to 15 show a third embodiment in which the knot hider 20 is provided at the winding part 10 of the spool S and a separate line clip 20C.

Figure 4:
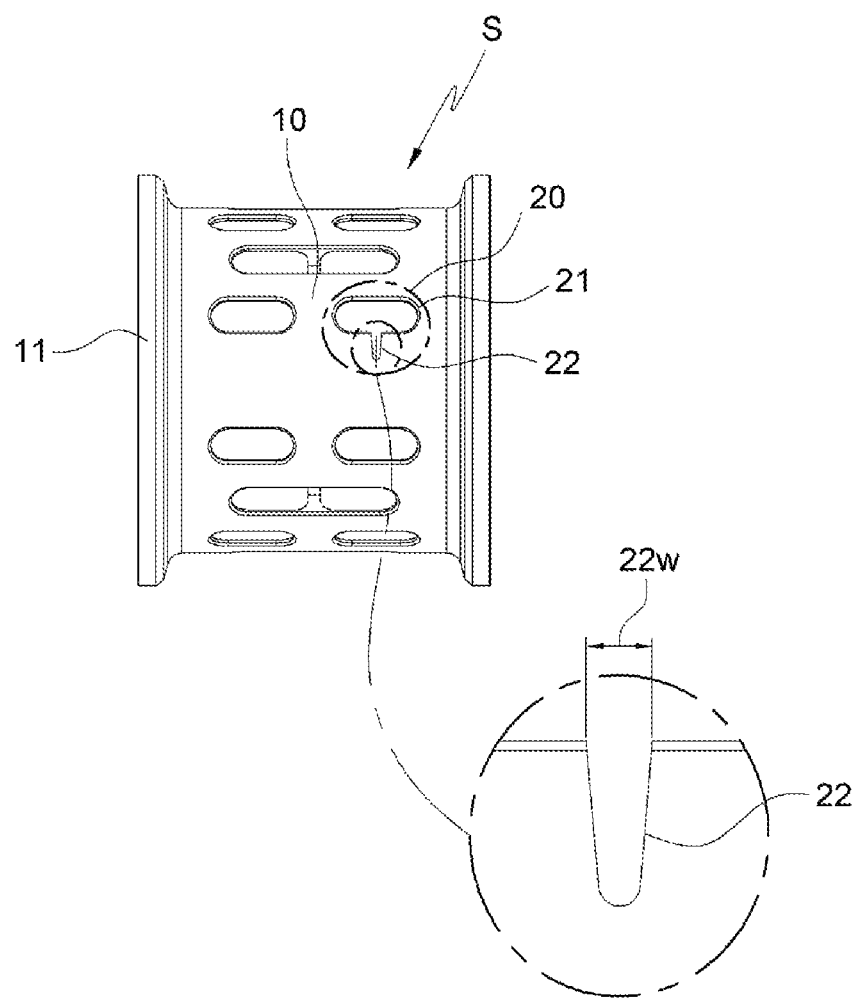
FIGS. 4, 5, and 6 are front views showing a second embodiment according to the present disclosure.
Figure 5:
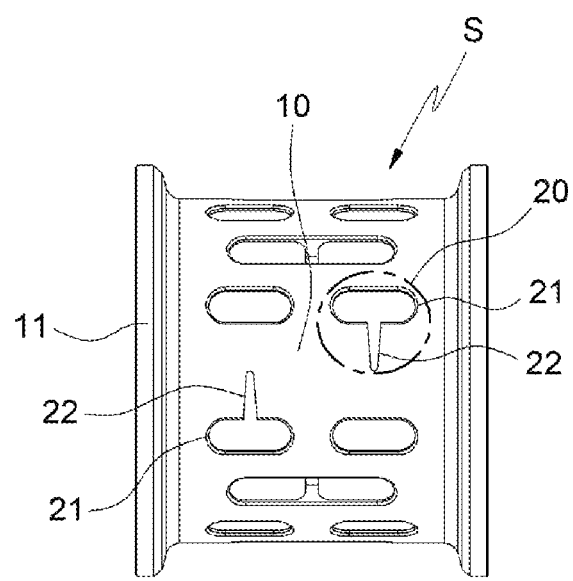
Figure 6:
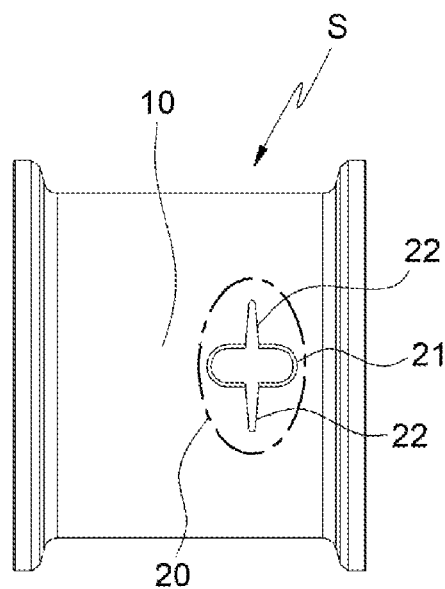
Figure 7:
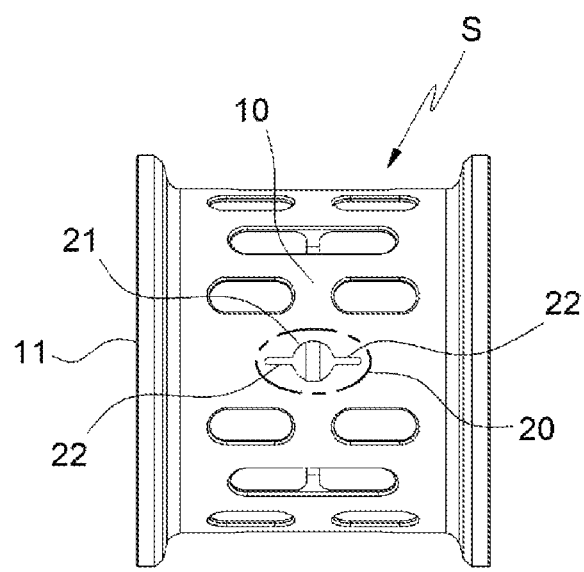
FIGS. 7 and 8 are views showing modified examples of the locking groove shown in FIGS. 4 to 6.
Figure 8:
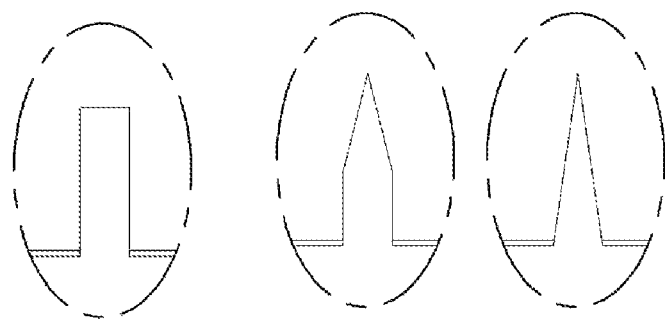
Figure 8:
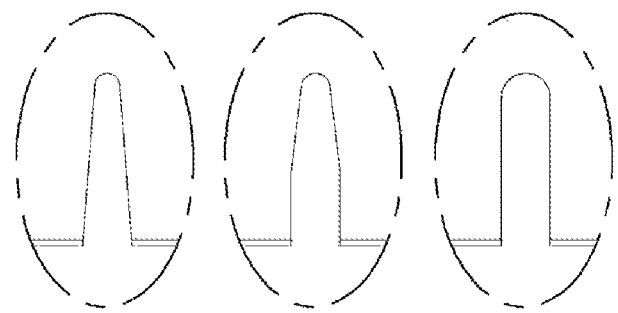
Figure 8:
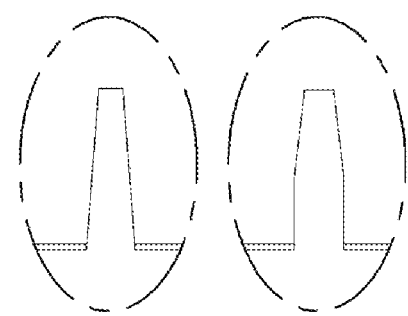

As the insertion hole 21, as shown in FIGS. 4, 5, and 7, one of a plurality of holes formed in the circumferential direction of the winding part 10 may be used to decrease the weight of the spool S, or as shown in FIG. 6, an insertion hole 21 may be individually added for the knot hider 20.

The insertion hole 21 has only to have a size through which a knot of a fishing line can pass and the shape thereof is not limited, including an ellipse, an oblong, and a circle.

The locking groove 22 is elongated to a side from the insertion hole 21, the short width 22w of the locking groove 22 is smaller than the inner diameter of the insertion hole 21, and the locking groove 22 may be formed larger than the thickness of a fishing line and smaller than a knot of a fishing line. In this case, since the thickness of the knot may be freely changed by users, the width 22s of the short side of the locking groove 22 has only to corresponding to the thicknesses (the number of Ho) of fishing lines that are generally used.

Embodiments in which the insertion hole 21 and the locking groove 22 are connected in a '⊥' shape or '+' shape in the figures of the specification, but the connection shape may be changed in various ways. That is, for example, the knot hider 20 may be formed in one long elliptical or diamond shape such that a wider portion functions as the insertion hole and a narrow portion functions as the locking groove 22.

Accordingly, when a user ties an end of a fishing line using general knotting, inserts the knot into the insertion hole 21, and then fits the fishing line into the outer end of the locking groove 22, the knot of the fishing line is locked to both ends of the locking groove 22. In this state, when a user winds the fishing line in the direction in which the fishing line is locked to the locking groove 22, the end of the fishing line is fixed on the spool S, whereby it is possible to easily and quickly wind the fishing line while maintaining tension of the fishing line.

One or more locking grooves 22 are provided around the insertion hole 21.

The configuration in which one or more locking grooves 22 are provided around the insertion hole 21 may include not only that one locking groove 22 is provided at a side of one insertion hole 21, but that locking grooves 22 are provided in opposite directions at different insertion holes 21, respectively, as shown in FIG. 5 or that a pair of locking groove 22 is symmetrically (or asymmetrically) provided at one insertion hole 21, as shown in FIGS. 6 and 7. That is, the number, arrangement, etc. of the locking groove 22 may be changed in various ways.

In this case, the longitudinal direction of each of the locking grooves 22 may be the left-right longitudinal direction of the spool S or the circumferential direction of the spool S.

The locking grooves 22 have only to have a predetermined length so that a fishing line can be fitted and locked therein in one direction, and the shape thereof is not limited. Locking grooves 22 having various shapes can be seen from the enlarged view of FIG. 4 and FIG. 8.

The locking grooves 22 may be characterized in that the short width 22w gradually decreases or is uniform from an end to another end.

That is, the left-right width 22w of the locking grooves 22 may decrease or may be uniform outward from the inner side connected to the insertion hole 21.

In this case, the outermost end of the locking grooves 22 have a width corresponding to the number of Ho of the smallest thickness of fishing lines having various thicknesses.

Accordingly, when a user fits and pulls a knot of a fishing line toward an outer end of the locking grooves 22, the knot of the fishing line is fitted and locked to a position corresponding to the thickness of the fishing line, whereby it is possible to connect and lock all of fishing lines having various thicknesses to the locking groove 22 regardless of the thicknesses of fishing lines.

Figure 9:
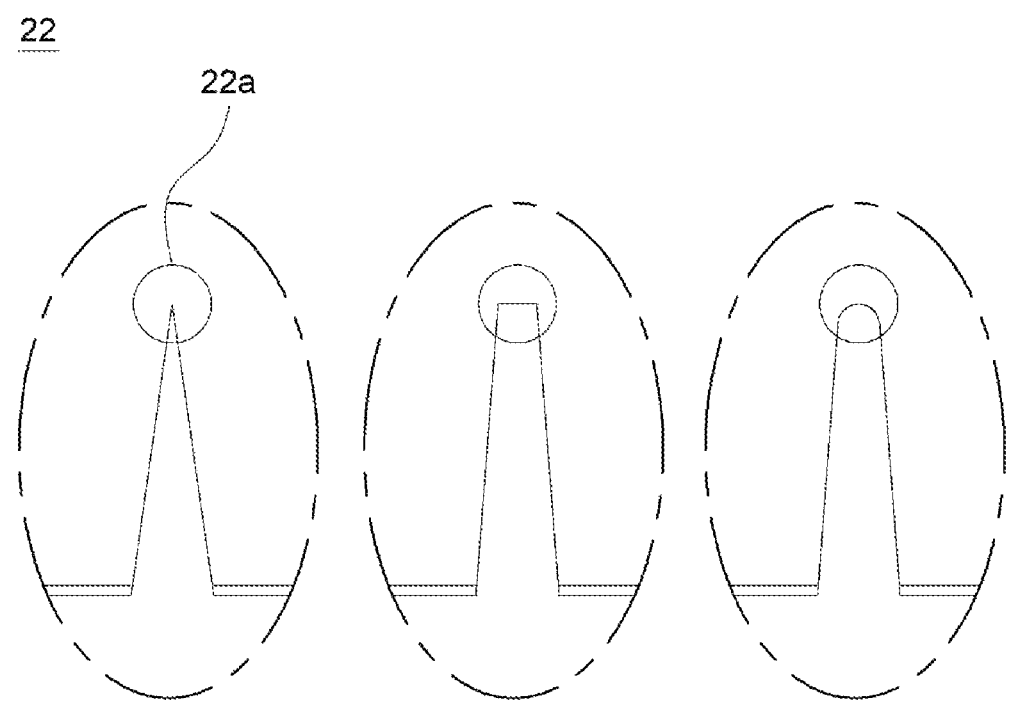
FIG. 9 is a view showing modified examples of FIG. 6.
Figure 10:
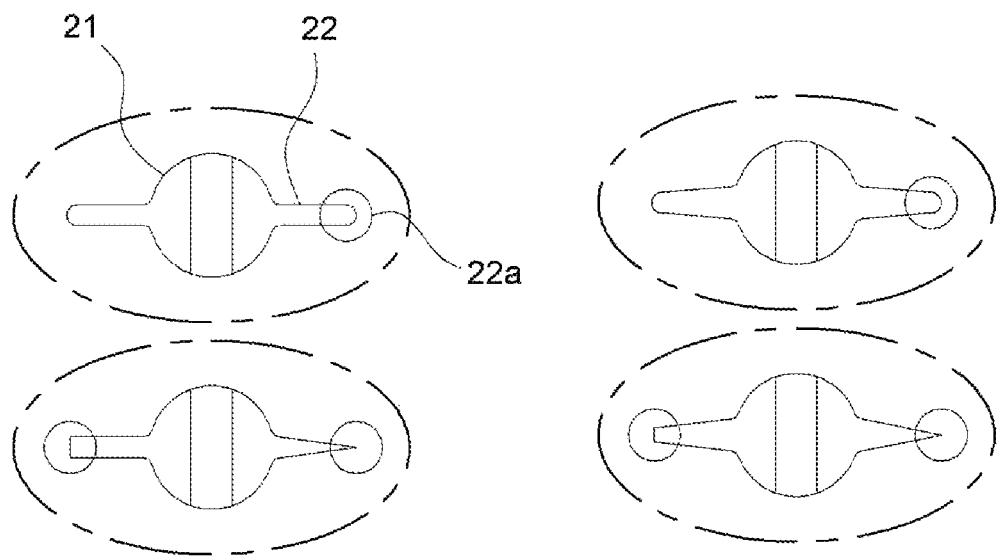
FIG. 10 is a view showing modified examples of the knot hider shown in FIG. 9.

As shown in FIGS. 9 and 10, the locking grooves 22 are characterized by further having a locking hole 22a formed by extending the short width 22w that gradually decreases at another end.

The locking hole 22a is a hole having an inner diameter larger than the width of the end of the locking grooves 22 and the width 22w of the locking groove 22 decreases and the inner diameter increases at the locking hole 22a, so the locking groove 22 may have a structure in which the short width 22w is large, small, and then large.

Accordingly, when a user makes a knot thicker than the inner diameter of the locking hole 22a, fits the fishing line into the locking groove 22, and then forcibly fits the fishing line into the locking hole 22a, the knot of the fishing line is not only not pulled out of the locking groove 22, but not moved in the longitudinal direction of the locking groove 22, so the fishing line can be more stably maintained in the fixed state.

As shown in FIG. 10, a pair of locking groove 22 having asymmetric shapes (regardless of whether there is a locking hole 22a or not) may be provided.

When asymmetric locking grooves 22 are provided, it is possible to select one of the locking grooves 22 in accordance with the thickness (number of Ho) of a fishing line and connect the fishing line.

Next, a third embodiment of the present disclosure is described with reference to FIGS. 11 to 15.

The present disclosure further includes a mounting hole 12 formed through the winding part 10, and a line clip 20c fitted in the mounting hole 12 and having the knot hider 20.

The mounting hole 12 may be a separate hole for mounting the line clip 20C or may be one of holes for reducing the weight of the spool S.

Two mounting holes 12 may be symmetrically arranged or three or more mounting holes 12 may be arranged in the circumferential direction of the winding part 10, and the line clip 20C may be mounted in all of the mounting holes 12 in use.

The line clip 20C may be an injection product that is a separate part having the knot hider 20, and the detailed structures, etc. of the insertion hole 21 and the locking groove 22 that the line clip 20C has are the same as those described above.

In detail, the line clip 20C has a locking protrusion 24 that forms a portion of a side wall protruding along the edge of the rear surface and protrudes outward, and when the locking clip 20C is fitted in the mounting hole 12, the locking protrusion 24 is locked to the inner surface of the winding part 10, whereby the line clip 20C is completely mounted.

In this configuration, the side wall of the line clip 20C is supported on the outer end of a separation wall 13a, whereby the line clip 20C is prevented from being excessively inserted into the winding part 10.

As shown in FIG. 14, when the line clip 20C is provided at the flange 11 of the winding part 10, the side wall may be supported on a spool plate that is coupled to an opening of the winding part 10.

Figure 11:
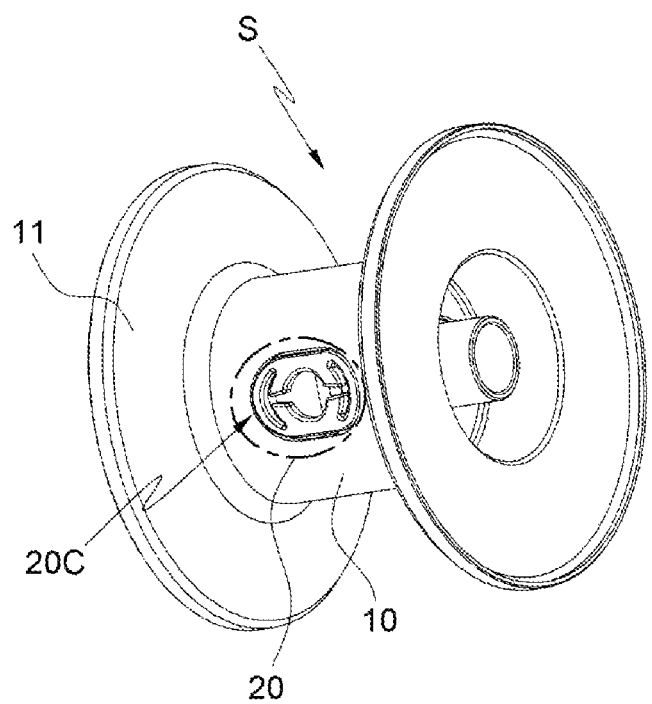
FIG. 11 is a perspective view of a third embodiment of the present disclosure.
Figure 12:
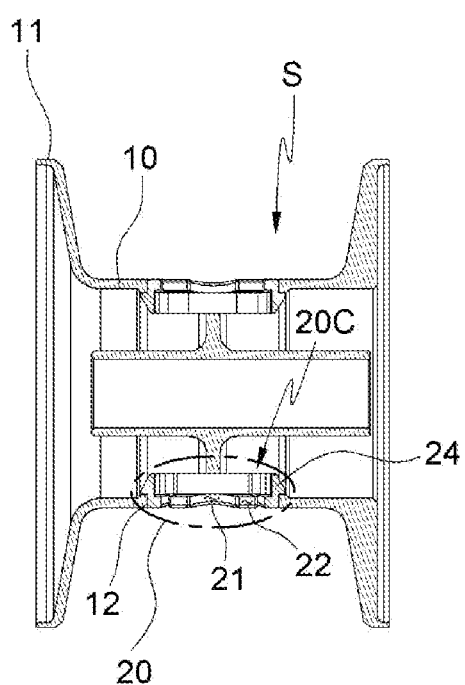
FIG. 12 is a cross-sectional view of FIG. 11.
Figure 13:
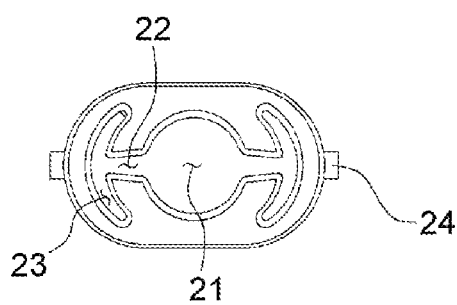
FIG. 13 is a view showing modified examples of the knot hider shown in FIG. 11.
Figure 13:
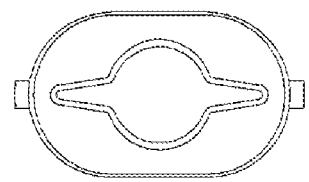
Figure 13:
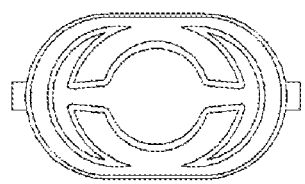
Figure 13:
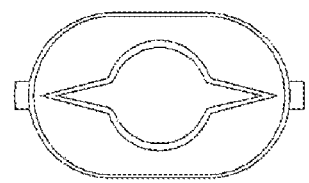
Figure 13:
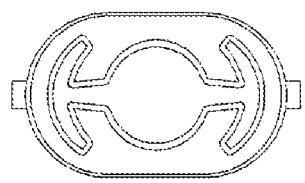

As shown in FIGS. 11 to 13, the locking groove 22 has a curved groove 23 extending to a side or both sides across the longitudinal direction of the locking groove 22 from another end thereof.

It can be seen from FIG. 13 that curved grooves 23 are connected to both sides of the locking groove 22, respectively, in which the curved grooves 22 are connected in an arc shape or an arrow shape, thereby minimizing the area of the knot hider 20.

The curved grooves 23 may also be formed such that the width gradually decreases toward an outer end from the portion connected to the locking groove 22. Further, though not shown in the figures, the locking hole 22a may be further formed at the outer ends of the curved grooves 23.

The curved grooves 23 enable a user to use fishing lines with various thicknesses and variously change the winding direction of fishing lines, and of course, the locking grooves 23 can be applied to the second embodiment.

Since the thickness of fishing lines depends on the kinds of desired fish, the widths and depths of the fitting groove 24 and the fitting hole 25 should corresponding to the maximum diameter of fishing lines in order to hide all kinds of fishing lines in the fitting groove 24 and the fitting hole 25.

When a fishing line with a small diameter is hidden, a step may be formed on the surface of the winding part 10, so the first embodiment of the present disclosure further includes a step-covering hiding ring 30.

Figure 16:
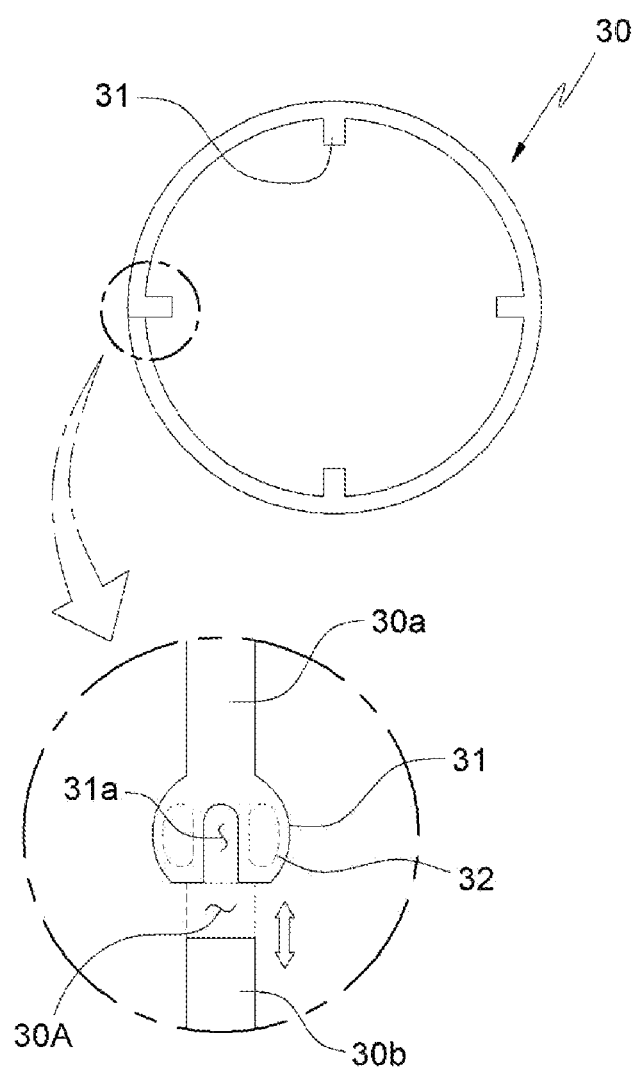
FIG. 16 is a view showing the configuration of a hiding ring of the present disclosure.

As shown in FIG. 16, the hiding ring 30 is a C-shaped ring with a cut portion. The hiding ring 30 can be fitted in the fitting groove 24 because it has a width corresponding to the width of the fitting groove 24, and has a cap 31 that can be inserted in correspondence to the fitting hole 25. The cap 31 is formed at an end where an opening 30A is formed between both ends 30a and 30b of the ring and has a fishing line pass groove 31a.

The hiding ring 30 is made of an elastic material that can be opened over the outer diameter of the winding part 10 and can return into the circular ring shape, and caps 31 having a shape corresponding to the fitting holes 25 are circumferentially arranged.

The cap 31 has a hook protrusion 32 on the inner surface and is forcibly fitted in the fitting hole 25 in a hooking type.

The fishing line pass groove 31a is formed at the cap 31 at an end of the hiding ring 30 by cutting a portion of the cap 31 along the center of the cap 31.

After a fishing line is wound in the way described above, when a user opens both ends of the hiding ring 30, fits the hiding ring 30 on the winding part 10, and then lets go of the both ends, the hiding ring 30 elastically returns into the circular ring shape.

In this state, when the user fits the caps 31 into the fitting holes 25, respectively, by turning the ring, the openings of the fitting groove 24 and the fitting hole 25 are covered and the hiding ring 30 forms the surface of the winding part 10.

It is possible to fit the cap 31a having the fishing line pass groove 31a into the fitting hole 25 at which a knot is positioned so that the knot can be hidden inside the cap 31 and the fishing line is exposed out of the cap 31, whereby the fishing line can be wound on the winding part 10.

Further, although a spool S for a fishing reel was described with reference to the accompanying drawings, the present disclosure may be changed, modified, and replaced in various ways by those skilled in the art, and the change, modification, and replacement should be construed as being included in the protective range of the present disclosure.

What is claimed is:

1. A spool for a fishing ring, the spool comprising:
a drum-shaped winding part mounted on a reel body by a shaft and configured to wind a fishing line on an outer surface thereof;
a spoke wall dividing an internal space of the winding part into left and right sections; and
a knot hider configured to hide a knot of the fishing line inside a surface of the winding part,
wherein the knot hider includes: a fitting groove formed around the surface of the winding part such that a ring of a knotted fishing line is fitted therein; and a hiding section connected to the fitting groove to accommodate the knot of the fishing line, and
wherein the fitting groove is disposed on the same line as the spoke wall, and the hiding section is formed at left and right sides of the spoke wall.

2. A spool for a fishing ring, the spool comprising:
a drum-shaped winding part mounted on a reel body by a shaft and configured to wind a fishing line on an outer surface thereof; and
a knot hider configured to hide a knot of the fishing line inside a surface of the winding part,
wherein the knot hider includes:
an insertion hole formed through the winding part such that a knot of a fishing line the knot of the fishing line is inserted inside the winding part; and
a locking groove formed through the winding part with an end connected to the insertion hole such that the knot of the fishing line inserted in the insertion hole is locked inside the winding part.

* * * * *